(12) United States Patent
Ho et al.

(10) Patent No.: US 6,408,181 B1
(45) Date of Patent: Jun. 18, 2002

(54) METHOD AND SYSTEM FOR REDUCING CALL SETUP BY ROAMING NUMBER CACHING

(75) Inventors: Joseph S. M. Ho, Dallas; Jim Xu, Plano, both of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/244,923

(22) Filed: Feb. 4, 1999

(51) Int. Cl.[7] .................................................. H04Q 7/20
(52) U.S. Cl. ........................ 455/432; 455/445; 455/560
(58) Field of Search ................................. 455/432, 433, 455/435, 414, 445, 560, 405

(56) References Cited

U.S. PATENT DOCUMENTS

| 5,400,390 A | * | 3/1995 | Salin ............................ 455/433 |
| 5,481,592 A | * | 1/1996 | Azer ............................ 455/560 |
| 5,712,900 A | * | 1/1998 | Maupin et al. .............. 455/433 |
| 6,035,198 A | * | 3/2000 | Wiehe .......................... 455/433 |
| 6,101,382 A | * | 8/2000 | Granberg ..................... 455/414 |
| 6,157,832 A | * | 12/2000 | Lahtinen ..................... 455/433 |

* cited by examiner

*Primary Examiner*—Nguyen T. Vo
*Assistant Examiner*—Eliseo Ramos-Feliciano
(74) *Attorney, Agent, or Firm*—John D. Crane; Bracewell & Patterson, L.L.P.

(57) ABSTRACT

A method and system for improving overall system capacity in GSM networks by reducing the number of home location register and visitor location register queries is disclosed. The method and system allows the reuse of the MSRN by allocating the MSRN to a mobile terminal and using it for future calls. The method of the present invention allows the GMSC to cache the MSRN for a called mobile terminal. During a first call setup, an entry is recorded at a cache register that maps the Mobile Subscriber ISDN Number (MSISDN) of the mobile terminal to a previously allocated MSRN. Additionally, the Bearer Capability (BC) associated with this MSRN is also recorded in the cache register. When the next call arrives, the GMSC first checks if a MSRN for that called mobile terminal already exists in its cache register. If a cached MSRN is available and the BC associated with the cached MSRN matches the BC requested by the current call, then the GMSC uses the cached MSRN to route the call to the VMSC. The method and system of the present invention makes it unnecessary to query the HLR and VLR when a land-to-mobile call arrives thereby increasing network capacity while reducing processing load.

19 Claims, 7 Drawing Sheets

METHOD AND SYSTEM FOR REDUCING CALL SETUP BY ROAMING NUMBER CACHING

BACKGROUND OF THE INVENTION

1. Technical Field

The present invention is directed to an improved method and system for increasing network capacity in a Global System for Mobile Communications (hereinafter GSM) networks and in particular for overall system capacity improvement by reducing the number of home location register and visitor location register queries. Still more particularly the present invention relates to an improved method and system that allows the routing of calls from a gateway mobile switching center to a visiting mobile switching center without home location register and visitor location register queries.

2. Description of the Related Art

In telecommunications, based on a Global System for Mobile Communications "GSM" standard, a land-to-mobile phone call consists of two-phases; a setup phase and a user communication phase. During the call setup phase, signaling messages are exchanged between a mobile terminal and a network through a dedicated signaling channel. Currently, the land-to-mobile GSM call setup procedure requires the interrogation every time by a gateway mobile switching center GMSC to a remote home location register (referred to as HLR) and then to a visitor location register (referred to as VLR) located at a visiting mobile switching center for the network to set up a call to the mobile terminal. Having to continuously interrogate the HLR and visiting mobile switching center (hereinafter the MSC) results in significant processing overhead at the GMSC, HLR and visiting MSC. This increases the signaling traffic load, as well as call setup delay.

Therefore, a need exists to increase network efficiency and improve the grade of service by reducing the HLR/MSC signal-processing load. Capacity improvement can be obtained by reducing the number of HLR/VLR queries. In view of the above, it should be apparent that a method and system that allows the routing of calls from the GMSC to the MSC without HLR and VLR queries would be highly desirable. The present invention solves this problem in a new and unique manner that has not been part of the art previously.

SUMMARY OF THE INVENTION

It is therefore one object of the present invention to provide an improved method for call setups for GSM networks and in particular for overall system capacity improvement in GSM networks by reducing the number of home location register and visitor location register queries.

It is another object of the present invention to provide a method which reduces the processing requirement at the home location register and the mobile switching centers due to the removal of some of the send routing information and provide roaming number messages.

It is yet another object of the present invention to provide an improved method that allows the routing of calls from a gateway mobile switching center to a visiting mobile switching center without home location register and visitor location register queries.

It is still yet another object of the present invention to provide a method which reduces the signaling bandwidth requirements due to the reduction of the home location register and visitor location register queries for mobile terminated call setups.

The foregoing objects are achieved as is now described. A method and system for improving overall system capacity in GSM networks by reducing the number of home location register and visitor location register queries is disclosed. The method and system allows the reuse of the Mobile Subscriber Roaming Number (MSRN) by allocating the MSRN to a mobile terminal and using it for future calls. The method of the present invention allows the GMSC to cache the MSRN for a called mobile terminal. During a first call setup, an entry is recorded at a cache register that maps the Mobile Subscriber ISDN Number (MSISDN) of the mobile terminal to a previously allocated MSRN. Additionally, the Bearer Capability (BC) associated with this MSRN is also recorded in the cache register. When the next call arrives, the GMSC first checks if a MSRN for that called mobile terminal already exists in the cache register. If a cached MSRN is available and the BC associated with the cached MSRN matches the BC requested by the current call, then the GMSC uses the cached MSRN to route the call to the VMSC. The method and system of the present invention makes it unnecessary to query the HLR and VLR when a land-to-mobile call arrives thereby increasing network capacity while reducing processing load.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
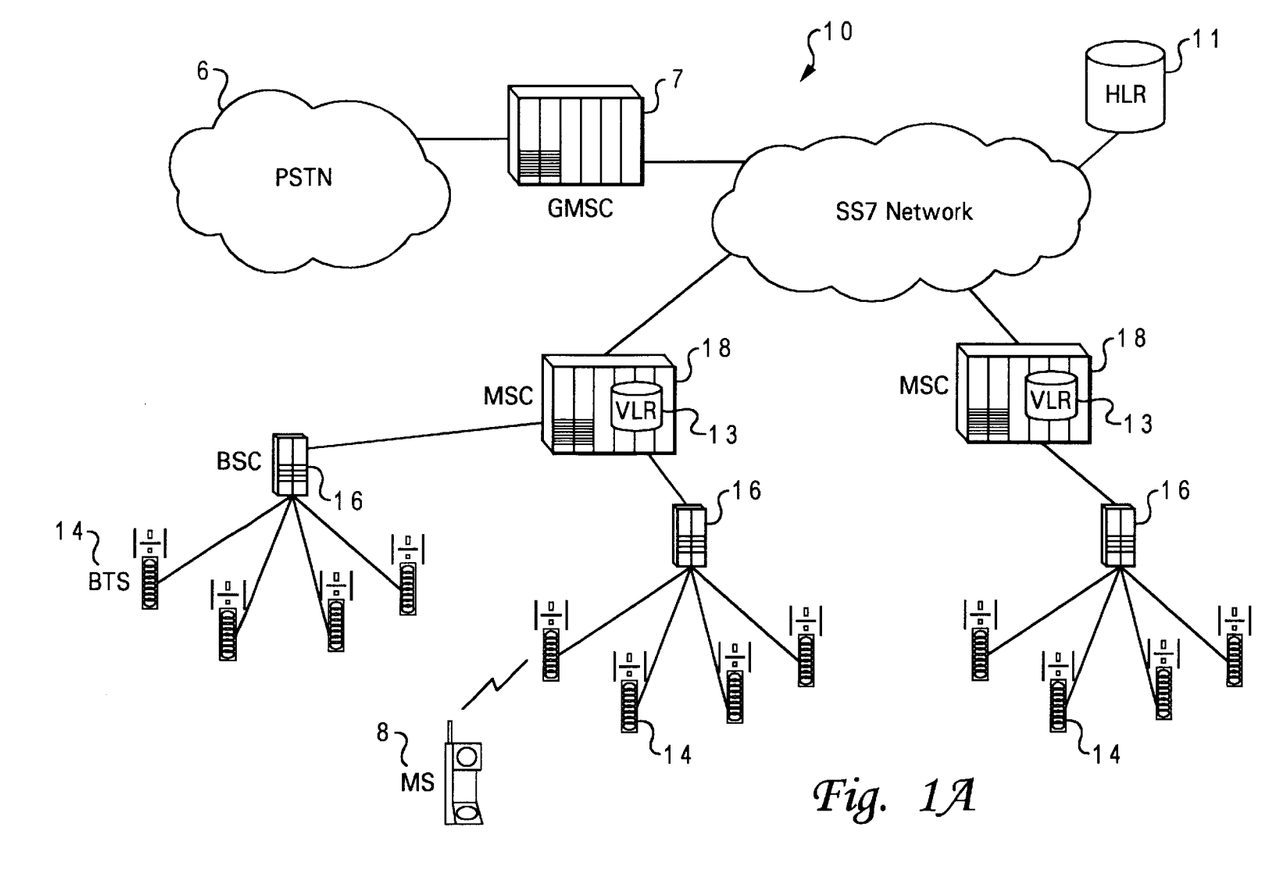
FIG. 1A is an illustrative block diagram of a GSM network in accordance with the present invention.

With reference now to the figures and in particular with reference to FIG. 1A, there is depicted a block diagram of an illustrative embodiment of a Global System for Mobile Communications (hereinafter GSM) network 10 in accordance with the present invention. The GSM 10 air interface consists of a number of channels which include Full Traffic Channels, Standalone Dedicated Control Channels, Random Access Channels, and a number of other channels, such as the Access Grant Channel and the Synchronization Channel.

Turning once again to FIG. 1A, the GSM network 10 consists of a number of Mobile Switching Centers (MSCs) 18. The MSC 18 is responsible for the switching of trunk circuits as well as the processing of call setup and mobility management signaling messages. A MSC 18 which has a direct trunk connection to the PSTN 6 is called the Gateway MSC (GMSC) 7. The GMSC 7 is the entry point to the GSM network 10 for all calls that originate from the PSTN 6. There may exist one or more GMSCs 7 in a GSM network 10. Each MSC 18 supports a number of Base Station Controllers (BSCS) 16 which, in turn, is connected to a number of Base Transceiver Stations (BTSs) 14. Most of the air interface related control functions, such as channel allocation, are implemented at the BSCs 16. The BTSs 14 are responsible for interfacing with the mobile terminal using the allocated GSM air channel. The MSC service area is divided into one or more non-overlapping Location Areas (LAs). Each LA consists of a number of BTSs 14. The coverage area of a BTS 14 is referred to as a cell.

Two types of database exist in the GSM network 10: the Home Location Register (HLR) 11 and the Visitor Location Register (VLR) 13. The HLR 11 stores the permanent records of its supported subscribers. These records contain information such as the serving VLRs 13, and the subscription parameters of the mobile terminals and many of the existing GSM networks 10 contain only one HLR 11. In practice, several HLRs 11 can be installed in a GSM network 10 when the subscriber population is large. The VLR 13 contains a copy of the records of the subscribers currently residing in its service area. In addition, the VLR 13 also keeps track of the current LA of each mobile terminal. This information is only temporarily stored at the VLR 13 and is removed from the VLR 13 once the subscriber moves to a neighboring VLR 13. Most network equipment manufacturers have adopted a combined MSC 18 and VLR 13 approach such that each VLR 13 co-locates with a MSC 18.

In a GSM network 10, the HLR 11 always stores the identity of the current serving, or visiting, MSC (VMSC) 24 of each of its support mobile terminals. This information is required for call setup when a call for a mobile terminal 8 arrives. To ensure that the HLR 11 contains the accurate and up-to-date VMSC ID of each of its support mobile terminals, a mobile terminal 8 must report its new location to the network when it moves to a new VMSC 24. This reporting procedure is commonly referred to as location update.

Figure 1B:
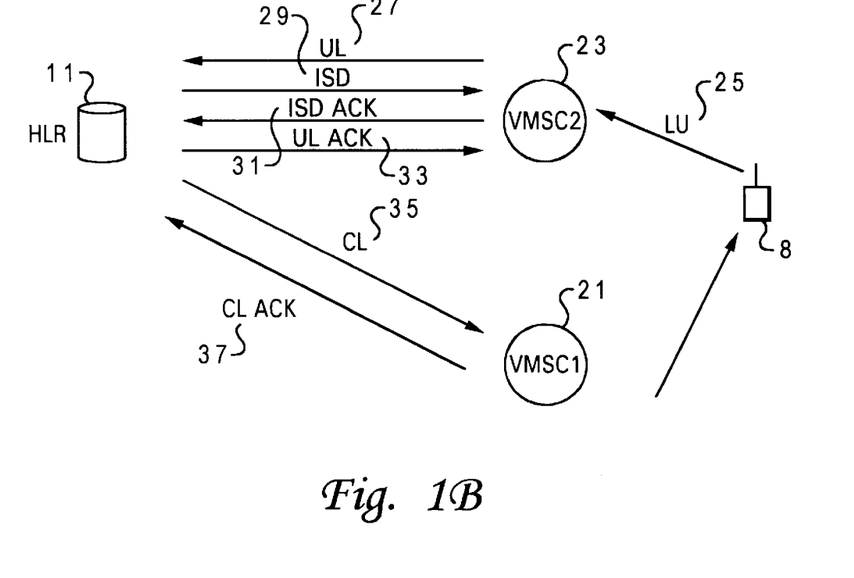
FIG. 1B is a detailed block diagram showing location update procedure when a mobile terminal moves to a new service areas under the GSM standard.

Referring now to FIG. 1B, shows the location update procedure when a mobile terminal moves from the service area of VMSC 1 21 to that of VMSC 2 23. When a mobile terminal 8 detects that it is in a new location area (LA), it will send a Location Update (LU) 25 message to the MSC 23 serving that LA through the GSM air channel, BTS 14 and BSC 16. If the mobile terminal 8 remains in the same VMSC 21, the VMSC 21 simply updates its associated VLR 13 indicating the new LA of the mobile terminal 8 and the location update procedure is complete. If the mobile terminal 8 has moved to a new VMSC 23, the VMSC 23 sends an Update Location (UL) 27 message to the HLR 11 of the mobile terminal 8. The HLR 11 updates its record indicating the new VMSC 23 of the mobile terminal 8 and sends an Insert Subscriber Data (ISD) 29 message to this new VMSC 23. This ISD 29 message contains a copy of the mobile terminal's subscriber profile. On receiving this ISD 29 message, the VMSC 23 stores the subscriber profile in its associated VLR 13 and sends an ISD ACK 31 message to the HLR 11. The HLR 11 then sends a UL ACK 33 to the VMSC 23. At the same time, the HLR 11 will also send a Cancel Location (CL) 35 message to the previous VMSC 21 of the mobile terminal 8. The previous VMSC 21 then deletes the subscriber profile for the mobile terminal 8 and sends a CL ACK 37 message to the HLR 11. This location update procedure allows the HLR 11 to keep track of the up-to-date VMSC ID of each of its supported mobile terminals.

Figure 2:
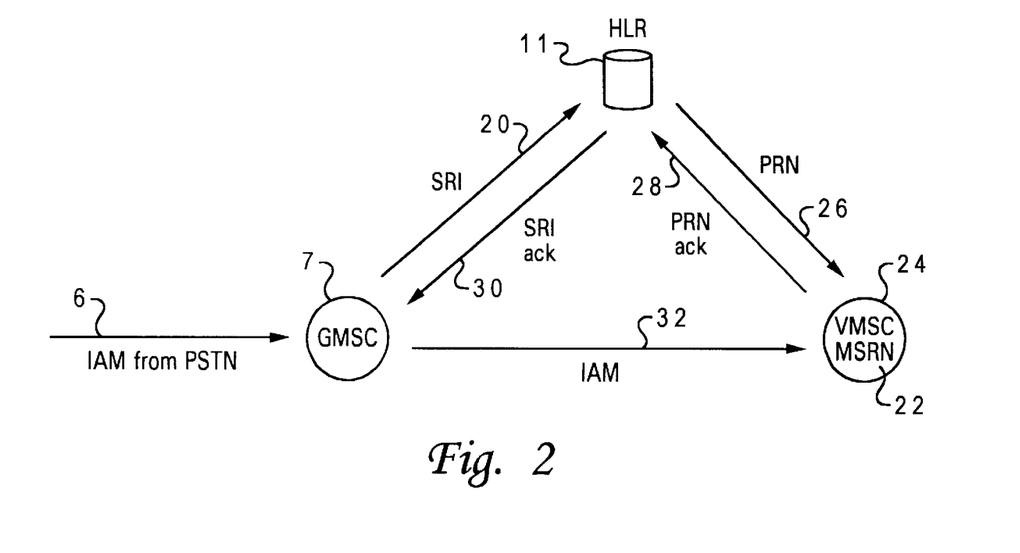
FIG. 2 is a detailed block diagram showing the signaling exchange for a land-to-mobile. call setup under the GSM standard.

Referring now to FIG. 2, there is depicted a detailed block diagram showing the signaling exchange for land-to-mobile call setup under the GSM standard. Based on the GSM call setup procedure, when a call for a particular mobile terminal arrives at the Gateway MSC 7 (GMSC), the GMSC 7 sends a Send Routing Information 20 (SRI) message to the HLR 11 requesting for the Mobile subscriber Roaming Number 22 (MSRN). The MSRN 22 is required for the GMSC 7 to route the call to the visiting MSC 24 (VMSC) of the mobile terminal. It is also used as an ID to identify the called mobile terminal in the connection request message that is sent from the GMSC 7 to the VMSC 24.

The HLR 11 then determines the visiting MSC 24 of the called mobile terminal by checking the profile of the mobile terminal. It then sends a Provide Roaming Number 26 (PRN) message to the VMSC 24. The visiting MSC 24 allocates a MSRN to the mobile terminal and sends a PRN ACK 28 message back to the HLR 11 together with the assigned MSRN 22. The HLR 11 then forwards this MSRN.22 to the GMSC 7 through a SRI ACK 30 message. The GMSC 7 routes the call to the VMSC 24 by an Initial Address Message (IAM) 32 using this MSRN 22 as the routing number. Based on this method, the HLR 11 and the VLR 13 of the VMSC 24 must be queried whenever a mobile terminating call arrives. The MSRN 22 is allocated to the mobile terminal only for one call setup attempt. Once the call has been successfully established (or failed to complete), the MSRN 22 will be released and it can be used for setting up a call to another mobile terminal.

Figure 3:
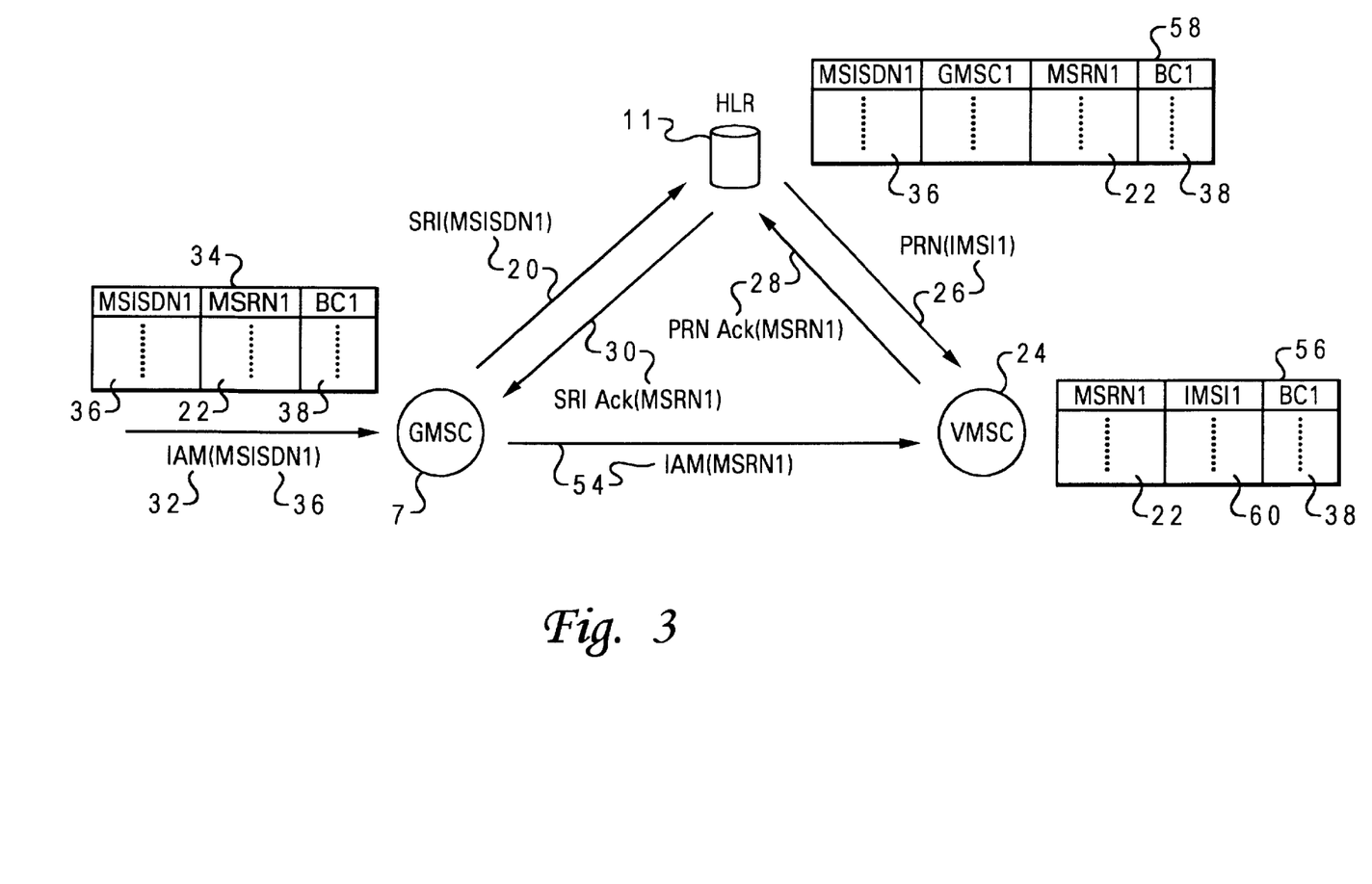
FIG. 3 is a block diagram for recording and reusing the MSRN for a mobile terminal at the GMSC in accordance with the present invention.
Figure 4:
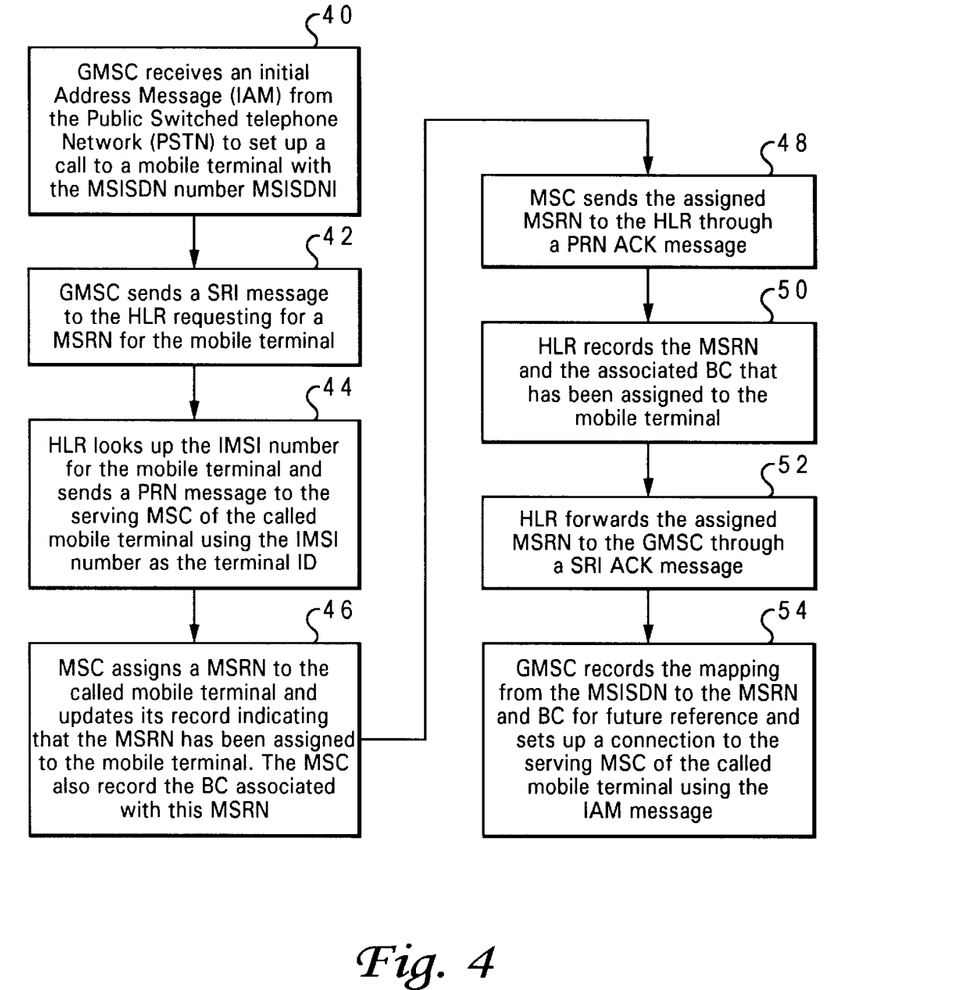
FIG. 4 is a flow diagram illustrating the method steps in accordance with the present invention.

Referring now to FIG. 3, depicts a block diagram for recording and reusing the MSRN 22 for a mobile terminal at the GMSC 7 in accordance with the present invention is shown. After a MSRN 22 is allocated to a mobile terminal, it will not be released from a mobile terminal and will be used for future calls to the same mobile terminal. The method of the present invention allows the GMSC 7 to cache (store in memory of a data processing system) the MSRN 22 for the called mobile terminal. An entry is recorded at a cache register 34 that maps the Mobile Subscriber integrated services digital network (ISDN) Number (MSISDN) 36 of the mobile terminal to a previously allocated MSRN 22. The Bearer Capability 38 (BC) associated with this MSRN 22 is also recorded in the cache register. The bearer capability defines the type of communication being preformed (e.g. fax, data, voice). Referring to FIG. 4, there is shown the method steps in accordance with the preferred embodiment of the present invention for recording the MSRN 22 for the mobile terminal at the GMSC 7 shown in FIG. 3. As shown in step 40, the GMSC 7 receives an Initial Address Message 32 (IAM) from the Public Switched 5 Telephone Network 6 (PSTN) to set up a call with a given bearer capability (BC) to a mobile terminal with the MSISDN number MSISDNI 36. Next, the GMSC 7 sends a SRI 20 message to the HLR 11 requesting for a MSRN 22 for the mobile terminal, as shown in step 42.

The HLR 11 as described in step 44 then looks up the IMSI 60 (International Mobile Subscriber Identity) number for the mobile terminal and sends a PRN message 26 to the serving MSC 24 of the called mobile terminal using the IMSI 60 number as the terminal ID. The VMSC 24 assigns a MSRN 22 to the called mobile terminal and updates its record (in its associated VLR) indicating that the MSRN 22 has been assigned to the mobile terminal. The VMSC 24 also records the BC 38 associated with this MSRN 22, as shown in step 46. The process then proceeds to step 48 wherein the VMSC 24 sends the assigned MSRN 22 to the HLR 11 through a PRN ACK 28 message. The HLR 11 records the MSRN 22 and the associated BC 38 in its cache 58 that has been assigned to the mobile terminal, as shown in step 50. The HLR 11 then forwards the assigned MSRN 22, in step 52 to the GMSC 7 through a SRI ACK 30 message. The GMSC 7 records the mapping from the MSISDN 36 to the MSRN 22 and BC 38 for future reference and sets up a connection to the serving MSC 24 of the called mobile terminal using the IAM 32 message, as shown in step 54.

Figure 5:
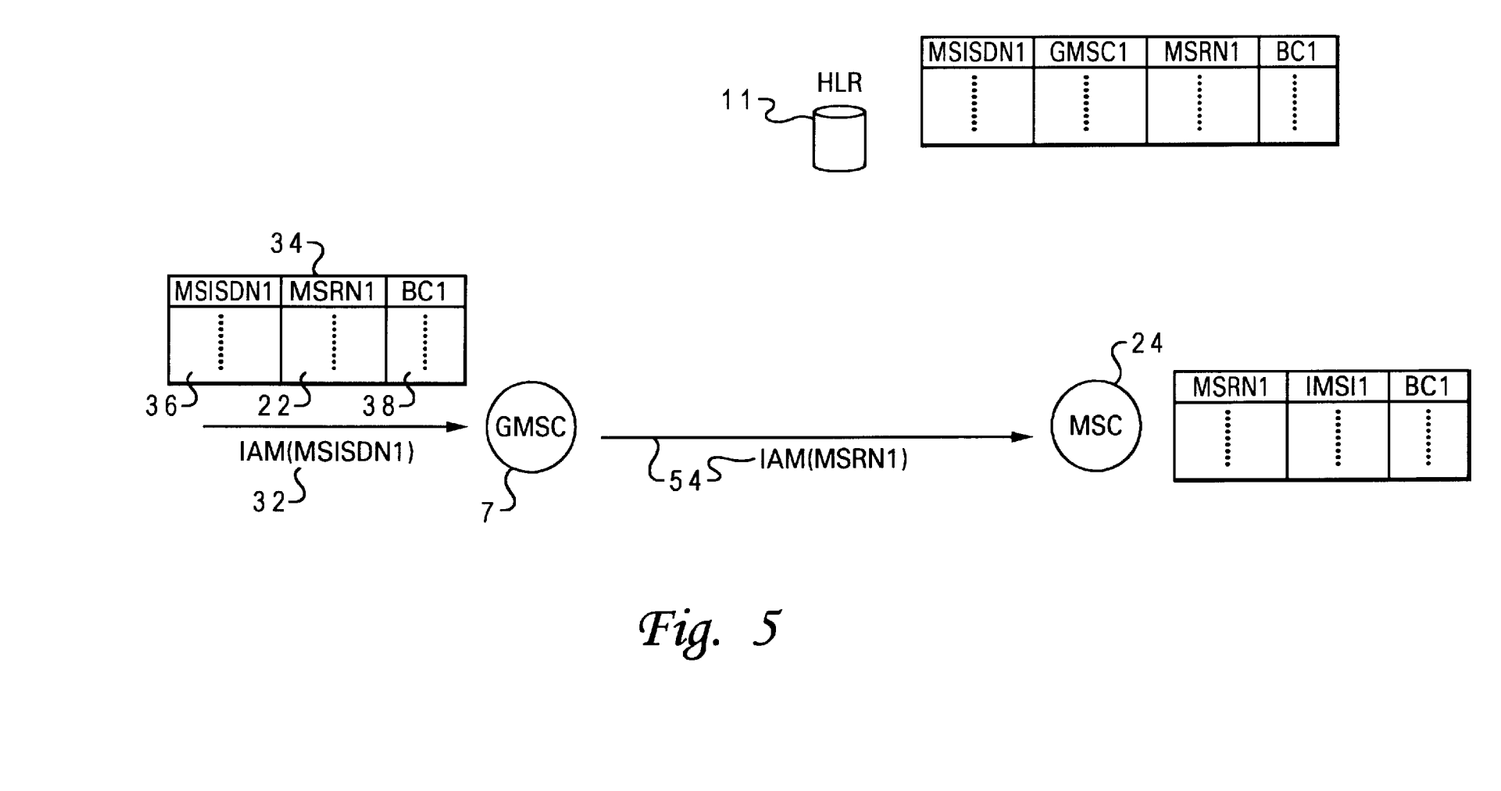
FIG. 5 is a block diagram depicting a new land-to-mobile call setup when using the method of the present invention.

Referring now to FIG. 5, a block diagram depicting the new land-to-mobile call setup is shown in accordance with the present invention. When the next call for a mobile terminal with a MSISDN number MSISDN1 36 arrives, the GMSC 7 will first check if a MSRN for that called mobile terminal already exists in the cache register 34. If a cached MSRN 22 is available, the GMSC 7 checks if the BC associated with the cached MSRN 22 matches the BC 38 requested by the current call, then the GMSC 7 will use this cached MSRN 22 to route the call to the VMSC 24. More specifically, the GMSC 7 receives an Initial Address Message (IAM) 32 from the Public Switched telephone Network (PSTN) 6 to set up a call with bearer capability BC1 38 to a mobile terminal with the MSISDN number MSISDN1 36. The GMSC 7 then looks up in its cache register 34 for the MSRN 22 of the called mobile terminal. If a cached MSRN is found and the BC 38 associated with that MSRN matches that requested by the current call, then the GMSC 7 sends an IAM 54 message to the visiting MSC 24 to set up a trunk connection. Otherwise, the standard GSM 10 call set up procedure shown in FIG. 2 will be used. Therefore, the method and system of the present invention makes it unnecessary to query the HLR 11 and VLR 13 when a land-to-mobile call arrives.

Figure 6:
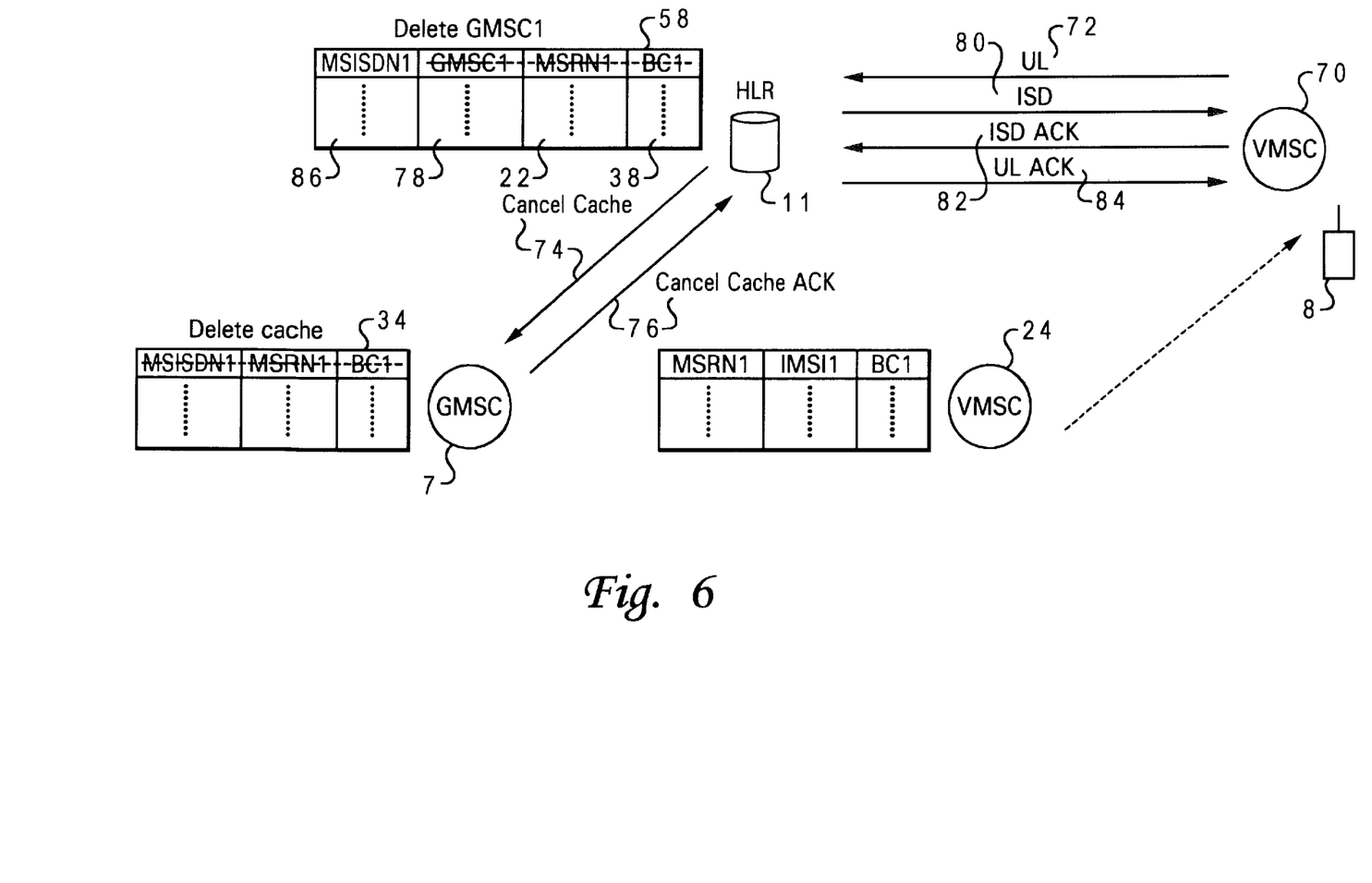
FIG. 6 is detailed block diagram for location update and cache removal in accordance with a preferred embodiment of the present invention.

When the mobile terminal moves to another MSC area, the HLR 11 will cancel the cache entry recorded at the GMSC 7. The first call that arrives after an inter-MSC movement will be delivered using call delivery method as shown an in FIG. 3. Thereafter, the method and system of the present invention is used to delivery subsequent calls as shown in FIG. 5. FIG. 6 depicts a detailed block diagram for location update and cache removal in accordance with a preferred embodiment of the present invention. Referring to FIG. 6, when the terminal or mobile subscriber 8 moves to another MSC, it sends a location update request to the new VMSC 70, which then sends a Update Location (UL) 72 message to the HLR 11. The HLR 11 determines the GMSCs that has cache entries for the mobile terminal by table lookup and sends Cancel Cache 74 messages to these GMSCs 7. The Cancel Cache 74 message is a propriety message similar to the Cancel Location message as defined in the GSM standard. The GMSC 7 then deletes the cache 34 entry for the terminal and sends a Cancel Cache ACK 76 message to the HLR 11. The HLR 11 then updates the MSISDN-GMSC mapping table 58 to remove the GMSC 78, BC 38 and MSRN 22 associated with the target terminal 24 and sends an ISD 80 message to the new VMSC 70. The new MSC 70 responds by forwarding an ISD ACK 82 message and the HLR 11 sends back an UL ACK 84 message to the new MSC 70.

In networks where the number of available MSRNs is limited, it is not possible to allocate MSRNs to all mobile terminals permanently. This problem can be solved either by using private non-global MSRNs numbers that are recognized only within a GSM 10 network utilizing the method and system of the present invention. As a result, no global MSRN numbers are needed to route calls from the GSMC 7 to the VMSC 24 as long as they both belong to the same network. This results in more flexibility in MSRN assignment. However, if the assignment of private MSRN numbers is not feasible, then an MSRN caching scheme may be applied to a particular group of mobile terminals that have high call arrival rates.

Therefore, in another preferred embodiment of the present invention, a two class MSRN caching scheme is designed for networks where the number of available MSRN's is limited. More specifically, the serving MSC of the mobile terminal keeps a register which records the number of mobile terminating calls the mobile terminal has received during the last observation period. An observation period may be one hour, one day, or the busy hour of each day depending on the desired implementation. The group of mobile terminals which has the "K" highest mobile terminating call arrival rates during the last observation period are designated as the first class or "Class One". A "Class One" mobile terminal is assigned a multiple-use class or "Class One" MSRN. The other terminals or "Class Two" are assigned single-use class or "Class Two" MSRN. The GMSC will only set up a cache record for mobile terminals that are assigned a "Class One" MSRN. For terminals that are assigned a "Class Two" MSRN, the GMSC will not keep any record in its cache database. The standard GSM call set up scheme will be used and the MSRN assigned to a "Class Two" mobile terminal will be released from the mobile terminal once the call set up is completed.

Furthermore, a "Class Two" mobile terminal can acquire the "Class One" classification at the end of an observation period as the number of land-to-mobile calls it receives during the last observation period increases such that it becomes one of the "K" mobile terminals with the highest call arrival rates. When a new "Class One" mobile terminal receives a call and requests for a MSRN, a "Class One" MSRN will be assigned to the mobile terminal if available. Otherwise, a "Class Two" MSRN will be assigned to the mobile terminal. Similarly, a "Class One" mobile terminal can be downgraded to the "Class Two" classification at the end of an observation period if the number of land-to-mobile calls it receives during the last observation period decreases such that it is no longer one of the "K" mobile terminals with the highest call arrival rate.

To ensure that "Class One" MSRNs can be reclaimed from mobile terminals which no longer have the "Class One" classification, each "Class One" MSRN is associated with two timeout periods "t1" and "t2". For the mobile terminal that owns the "Class One" MSRN and has not received a call for a time period longer than "t1", the GMSC that caches this MSRN will remove the cache entry for this mobile terminal. If a "Class One" mobile terminal has not received a call for a time period longer than "t2", the VMSC will downgrade the classification of this mobile terminal to "class two" and send a cancel cache message to a home location register to remove the cache entry for the mobile terminal at the HLR. After removing the cache entry for the mobile terminal, the HLR will send a cancel cache ACK message to the VMSC. At the same time the serving MSC of the mobile terminal will release the "Class One" MSRN assigned to the mobile terminal for use by other mobile terminals that has attained the "Class One" classification. The timeout period, "t1" and "t2", are configurable parameters for each MSC and GMSC.

Figure 7:
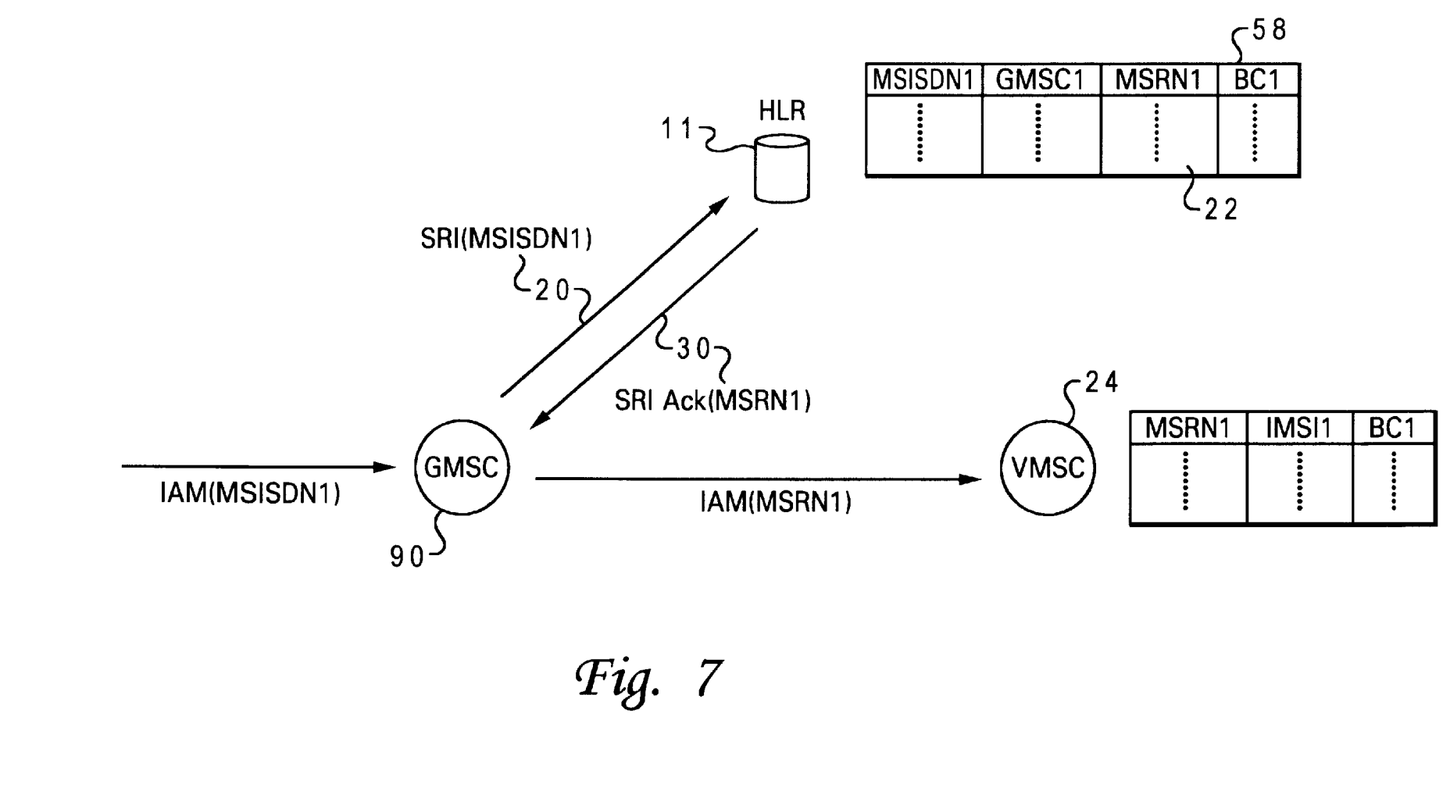
FIG. 7 is detailed block diagram for another preferred embodiment in accordance with the present invention for GMSC's that do not have cache management capability.

Referring now to FIG. 7, a block diagram is depicted for yet another preferred embodiment in accordance with the present invention for GMSC's that do not have cache management capability. For GMSCs 90 that do not have a cache management capability, no cache entry can be setup at these GMSCs 90. When a call arrives at the GMSC 90, the GMSC 90 will send a SRI 20 message to the HLR 11. If the mobile terminal has previously been assigned a MSRN 22 for the same bearer capability requirement, the HLR 11 will send a SRI ACK 30 to the GMSC 90 with the assigned MSRN 22. Otherwise, the HLR 11 will send a PRN message to the serving MSC 24 to request for a MSRN 22. Therefore in accordance with this preferred embodiment of the present invention, the cache 58 will be stored at the HLR 11 instead of at the GMSC 90.

In the case were a network component fails, as an example when a GMSC reset occurs, the GMSC may lose all the information in its cache register. When an IAM message arrives at the GMSC after a GMSC reset, the GMSC could not locate an entry for the called mobile terminal. If such a scenario occurs, based on the method of the present invention, the GMSC will send a SRI message to the HLR to request for a MSRN for the called mobile terminal. If no MSRN has been previously assigned to this called mobile terminal, the standard GSM call setup method as shown in FIG. 2 or the modified called setup method as shown in FIG. 3 can be used to setup the call. If a MSRN has previously been assigned to the mobile terminal, the cache register at the HLR should contain information about the previous assignment and the HLR will simply send the GMSC a SRI ACK message, which contains the previously assigned MSRN. On receiving this SRI ACK, the GSM will re-establish a cache entry for the mobile terminal.

In the case when a VMSC reset occurs, the HLR will be notified of such VMSC failure and the HLR will send a Cancel Cache message to all GMSCs in the network that has cached one or more MSRNs assigned by the failed VMSC. On receiving these Cancel Cache messages, the GMSCs will delete all the cache entries that contain MSRNs that are assigned by the failed VMSC. In the case when a HLR reset occurs, when the HLR returns to operation, it will send Cancel Cache messages to all GMSCs in the network to cancel all the cache entries in all GMSCs.

As has been described, the present invention provides a method and system that reduces the processing requirement at the HLR and the MSCs due to the removal of some of the SRI and PRN messages. Note that the capacity improvement depends on the number of available roaming numbers and the land-to-mobile call arrival rates at each MSC. Additionally, the method and system further provides a procedure when there is insufficient MSRN numbers by using private non-global MSRNs or by applying the caching mechanism of the present invention only to a limited group of mobile terminals that have high call arrival traffic. Lastly, the method of the present invention only applies within the boundary of a particular network, or PLMN (Public Land Mobile Network). The GMSC will not cache a MSRN that is assigned by a VMSC in another PLMN.

It is also important to note that although the present invention has been described in the context of a fully functional method for reducing call setup by roaming number caching, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for reducing call setup cost for mobile communications networks comprising the steps of:
   determining if a mobile subscriber integrated services digital network number with a bearer capability requirement of a call is located in a cache register of a gateway mobile switching center when receiving said call, said gateway mobile switching center having pre-assigned mobile subscriber roaming numbers with associated bearer capability stored in said cache;
   responsive to said determination, sending an initial address message directly from said gateway mobile switching center generated from said mobile subscriber roaming number to a visiting mobile switching center to set up a trunk connection for said call;
   designating a "Class One" mobile subscriber roaming number, for a "Class One" mobile terminal having one of a "K" highest said call arrival rates during a specified observation period and all else designated as a "Class Two" mobile terminal, wherein said gateway mobile switching center will only set up a cache record for calls for mobile terminals that are assigned a "Class One" mobile subscriber roaming number.

2. The method for reducing call setup cost for mobile communications networks according to claim 1, wherein responsive to said determination that said mobile subscriber integrated services digital network number of said call are not located in said cache register of said gateway mobile switching center, further comprises the steps of:
   sending a send routing information message from said gateway mobile switching center to a home location register requesting a mobile subscriber roaming number for a visiting mobile switching center.

3. The method for reducing call setup cost for mobile communications networks according to claim 2 wherein the step of sending said send routing information message further comprises the step of:
   sending a provide roaming number message to said visiting mobile switching center from said home location register using an international mobile subscriber identity number as a terminal ID looked up at said home location register.

4. The method for reducing call setup cost for mobile communications networks according to claim 3 wherein the step of sending said provide roaming number message further comprises the step of:
   assigning a mobile subscriber roaming number and associated bearer capability and updating a record at said visiting mobile switching center for said mobile terminal.

5. The method for reducing call setup cost for mobile communications networks according to claim 4 wherein the step of assigning said mobile subscriber roaming number and associated bearer capability further comprises the step of:

sending said mobile subscriber roaming number and associated bearer capability to said home location register through a provide roaming number acknowledgement message.

6. The method for reducing call setup cost for mobile communications networks according to claim 5 wherein the step of assigning said mobile subscriber roaming number and associated bearer capability further comprises the step of:

recording said mobile subscriber roaming number and associated bearer capability at said home location register.

7. The method for reducing call setup cost for mobile communications networks according to claim 6 wherein the step of recording said mobile subscriber roaming number and associated bearer capability further comprises the step of:

forwarding said mobile subscriber roaming number and associated bearer capability from said home location register to said gateway mobile switching center through a send routing information acknowledgement message.

8. The method for reducing call setup cost for mobile communications networks according to claim 7 wherein the step of recording said mobile subscriber roaming number and associated bearer capability further comprises the step of:

recording said mobile subscriber integrated services digital network number, said mobile subscriber roaming number and said associated bearer capability in said cache register of said gateway mobile switching center for future calls wherein said gateway mobile switching center sets up a connection to said visiting mobile switching center using said initial address message.

9. The method for reducing call setup cost for mobile communications networks according to claim 8 wherein the step determining if said mobile subscriber roaming number and associated bearer capability of said called mobile terminal are located in said cache register of said gateway mobile switching center further comprises the step of:

deleting said mobile subscriber roaming number and associated bearer capability in said cache register at said gateway mobile switching center and said home location register when said mobile terminal moves to a different visiting mobile switching center.

10. An information handling system for reducing call setup cost for mobile communications networks, comprising:

means for determining if a mobile subscriber integrated services digital network number with a bearer capability requirement of a call is located in a cache register of a gateway mobile switching center when receiving said call, said gateway mobile switching center having pre-assigned mobile subscriber roaming numbers with associated bearer capability stored in said cache;

responsive to said determination, means for sending an initial address message directly from said gateway mobile switching center generated from said mobile subscriber roaming number to a visiting mobile switching center to set up a trunk connection for said call; and means for designating a "Class One" mobile subscriber roaming number, for a "Class One" mobile terminal having one of a "K" highest said call arrival rates during a specified observation period and all else designated as a "Class Two" mobile terminal, wherein said gateway mobile switching center will only set up a cache record for calls for mobile terminals that are assigned a "Class One" mobile subscriber roaming number.

11. The information handling system for reducing call setup cost for mobile communications networks according to claim 10, wherein responsive to said determination that said mobile subscriber integrated services digital network number of said call are not located in said cache register of said gateway mobile switching center, further comprises:

means for sending a send routing information message from said gateway mobile switching center to a home location register requesting a mobile subscriber roaming number for a visiting mobile switching center.

12. An information handling system for reducing call setup cost for mobile communications networks according to claim 11 wherein said means for sending said send routing information message further comprises:

means for sending a provide roaming number message to said visiting mobile switching center from said home location register using an international mobile subscriber identity number as a terminal ID looked up at said home location register.

13. An information handling system for reducing call setup cost for mobile communications networks according to claim 12 wherein said means for sending said provide roaming number message further comprises:

means for assigning a mobile subscriber roaming number and associated bearer capability and updating a record at said visiting mobile switching center for said mobile terminal.

14. An information handling system for reducing call setup cost for mobile communications networks according to claim 13 wherein means for assigning said mobile subscriber roaming number and associated bearer capability further comprises:

means for sending said mobile subscriber roaming number and associated bearer capability to said home location register through a provide roaming number acknowledgement message.

15. An information handling system for reducing call setup cost for mobile communications networks according to claim 14 wherein means for assigning said mobile subscriber roaming number and associated bearer capability further comprises:

means for recording said mobile subscriber roaming number and associated bearer capability at said home location register.

16. An information handling system for reducing call setup cost for mobile communications networks according to claim 15 wherein means for recording said mobile subscriber roaming number and associated bearer capability further comprises:

means for forwarding said mobile subscriber roaming number and associated bearer capability from said home location register to said gateway mobile switching center through a send routing information acknowledgement message.

17. An information handling system for reducing call setup cost for mobile communications networks according to claim 16 wherein means for recording said mobile subscriber roaming number and associated bearer capability further comprises:

means for recording said mobile subscriber integrated services digital network number, said mobile subscriber roaming number and said associated bearer capability in said cache register of said gateway mobile switching center for future calls wherein said gateway mobile switching center sets up a connection to said visiting mobile switching center using said initial address message.

18. An information handling system for reducing call setup cost for mobile communications networks according to claim 17 wherein means for determining if said mobile subscriber roaming number and associated bearer capability of said called mobile terminal are located in said cache register of said gateway mobile switching center further comprises:

means for deleting said mobile subscriber roaming number and associated bearer capability in said cache register at said gateway mobile switching center and said home location register when said mobile terminal moves to a different visiting mobile switching center.

19. A computer program product residing on computer usable medium for reducing call setup cost for mobile communications networks, comprising:

instruction means for determining if a mobile subscriber integrated services digital network number with a bearer capability requirement of a call is located in a cache register of a gateway mobile switching center when receiving said call, said gateway mobile switching center having pre-assigned mobile subscriber roaming numbers with associated bearer capability stored in said cache;

responsive to said determination, instruction means for sending an initial address message directly from said gateway mobile switching center generated from said mobile subscriber roaming number to a visiting mobile switching center to set up a trunk connection for said call; and instruction means for designating a "Class One" mobile subscriber roaming number, for a "Class One" mobile terminal having one of a "K" highest said call arrival rates during a specified observation period and all else designated as a "Class Two" mobile terminal wherein said gateway mobile switching center will only set up a cache record for calls for mobile terminals that are assigned a "Class One" mobile subscriber roaming number.

* * * * *